United States Patent [19]
Nedbal

[11] Patent Number: 5,890,402
[45] Date of Patent: Apr. 6, 1999

[54] METHOD OF MAKING TOOL DIES

[75] Inventor: Thomas F. Nedbal, St. Charles, Ill.

[73] Assignee: Hill Engineering, Inc., Villa Park, Ill.

[21] Appl. No.: 841,614

[22] Filed: Apr. 29, 1997

[51] Int. Cl.⁶ .................................................. B21K 5/20
[52] U.S. Cl. .......................... 76/107.1; 29/525.14; 72/462
[58] Field of Search ................................ 76/107.1, 107.8, 76/104.1, 108.2; 72/462; 29/525.14

[56] References Cited

U.S. PATENT DOCUMENTS

| | | |
|---|---|---|
| 2,005,591 | 6/1935 | Meyercord . |
| 2,042,012 | 5/1936 | Lumsden .................................. 76/107.1 |
| 2,388,528 | 11/1945 | Curtiss, Jr. . |
| 2,515,589 | 7/1950 | Brauchler . |
| 2,679,172 | 5/1954 | Clevenger et al. . |
| 2,822,708 | 2/1958 | Nelson . |
| 3,327,569 | 6/1967 | Prutton . |
| 4,748,088 | 5/1988 | Billgren . |
| 5,032,483 | 7/1991 | Weaver . |
| 5,079,974 | 1/1992 | Weiss et al. . |
| 5,337,631 | 8/1994 | Singer et al. . |
| 5,507,169 | 4/1996 | Cullen . |
| 5,746,281 | 5/1998 | Hulkkonen .......................... 76/108.2 X |

FOREIGN PATENT DOCUMENTS

| | | | |
|---|---|---|---|
| 2229630 | 9/1990 | Japan ...................................... | 76/107.1 |

Primary Examiner—Douglas D. Watts
Attorney, Agent, or Firm—Wood, Phillips, VanSanten, Clark & Mortimer

[57] ABSTRACT

A method of forming tool dies, comprising the steps of (a) forming a plurality of unitary tool blank plates by mechanically securing a low carbon steel plate portion to a tool steel plate portion with a thin layer of brazing material therebetween, and heating the secured low carbon steel plate portion, tool steel plate portion, and brazing material layer to simultaneously (1) melt the brazing material to braze the low carbon steel plate portion to the tool steel plate portion and form the unitary blank plate, and (2) harden the tool steel plate portion, (b) maintaining an inventory of the tool blank plates, (c) retrieving one of the unitary blank plates from inventory in response to a tool die order from a customer, (d) operating on the retrieved blank plate to selectively shape the blank plate into a tool die as ordered by the customer, including (1) operating on the low carbon steel plate portion wherein at least a part of the operations on the low carbon steel plate portion do not include use of carbide tools or electric discharge machines, and (2) precision machining of the tool steel plate portion using at least one of carbide tools and electric discharge machines. Variations include forming the low carbon steel plate portion in a smaller size than the tool steel plate portion prior to shaping the tool steel plate portion, remaking the tool die by cutting off the tool steel plate portion and brazing a new tool steel plate portion to the low carbon steel plate portion, and using different grades of tool steel across the tool steel plate portion to provide added durability in areas where needed.

31 Claims, 3 Drawing Sheets

METHOD OF MAKING TOOL DIES

BACKGROUND OF THE INVENTION

1. Technical Field

The present invention is directed toward a method of making a metal component requiring precise shaping and durability on one side, and more particularly toward a method of making tool dies.

2. Background Art

Tool dies are commonly used for stamping and punching operations to create generally flat materials in specific shapes. For example, gaskets which are widely used in a variety of places, and having a variety of designs, are commonly formed in this manner.

Typically, such tool dies are formed from plates of expensive tool steel in order to provide a desired durability including resistance to wear and cracking. Once a tool die order and specifications are received from a customer, the plate of tool steel is typically machined in a variety of ways as preliminary steps to forming the tool die. The machined plate is then sent out for hardening to give it the strength required of the tool die. Given the time of heat treating for hardening, as well as transport time and general delay in getting the heat treatment scheduled, the hardening process can itself require a day in the manufacturing time of the tool die. Once the hardened plate is received back from the heat treater, further machining is then done on the plate to place it in its final precise designed configuration. Such machining is relatively expensive and time consuming, however, due to the fact that such machining is then being done on a hardened material.

A fast turn around time in creating a tool die is naturally a positive factor in relations with a customer for such tool die. Beyond the image of responsiveness, however, fast turn around can have significant cost advantages. For example, if a customer has a tool die break and has to shut down a tool until a new tool die is received, the losses associated with such down time are real costs. Tool operators may attempt to maintain backup tool dies for use during scheduled down time such as maintenance on a tool die, but unexpected problems with breaking concurrent with scheduled maintenance may still necessitate down time where enough backup tool dies are not maintained, or may require that they keep more costly backup dies available than generally required to avoid such hazards.

Further, the designer of a tool die is often required to make a difficult choice of materials, weighing the desirability of highly durable tool steel (and the related reduction in down time due to less frequent required maintenance) against the high cost of top grade tool steel.

The present invention is directed toward overcoming one or more of the problems set forth above.

SUMMARY OF THE INVENTION

In one aspect of the invention, a method of forming a metal component requiring precise shaping and durability on one side is provided, comprising the steps of (a) mechanically securing a low carbon steel plate to a tool steel plate with a thin layer of brazing material therebetween, (b) heating the secured low carbon steel plate, tool steel plate, and brazing material layer to simultaneously (1) melt the brazing material to braze the low carbon steel plate to the tool steel plate and form a unitary blank plate, and (2) harden the tool steel plate, and (c) operating on the blank plate to selectively shape the blank plate.

In a preferred form of this aspect of the present invention, the method includes the further steps of placing the unitary blank plate in inventory after the heating step, and performing the operating step responsive to customer specifications by retrieving one of the unitary blank plates from inventory and operating on the blank plate to selectively shape the blank plate in conformity with the customer specifications.

In another preferred form of this aspect of the present invention, the securing step comprises forming aligned holes of a first diameter in the low carbon steel plate, the tool steel plate, and the brazing material layer, and extending fastening means through the aligned holes, and the operating step includes forming tool holes of a second diameter in the unitary blank plate, the second diameter being greater than the first diameter, wherein the fastening means are removed from the unitary blank plate as a result of formation of the tool holes.

In another aspect of the present invention, a method of forming a metal component requiring a precise shape and durability on one side is provided, comprising the steps of (a) cutting a low carbon steel plate to a selected shape generally smaller than the precise shape required on one side of the component, (b) mechanically securing the cut low carbon steel plate to a tool steel plate with a thin layer of brazing material therebetween, (c) heating the secured low carbon steel plate, tool steel plate, and brazing material layer to simultaneously (1) melt the brazing material to braze the low carbon steel plate to the tool steel plate and form a unitary blank plate, and (2) harden the tool steel plate, and (d) operating on the blank plate to selectively shape the blank plate, including the step of cutting the tool steel plate to the precise shape by use of a wire electric discharge machine.

In a preferred form of this aspect of the present invention, the method further includes the steps of (d) placing the unitary blank plate in inventory after the heating step, and (e) performing the operating step responsive to customer specifications by retrieving one of the unitary blank plates from inventory and operating on the blank plate to selectively shape the blank plate in conformity with the customer specifications.

In another preferred form of this aspect of the present invention, threaded holes are formed in the low carbon steel plate portion of the blank plate after the heating step.

In still another aspect of the present invention, a method of forming tool dies is provided, comprising the steps of (a) forming a plurality of unitary tool blank plates by bonding a low carbon steel plate portion to a tool steel plate portion along substantially the entire surface between the steel plates, the tool steel plate portion being hardened, (b) maintaining an inventory of the tool blank plates, (c) retrieving one of the unitary blank plates from inventory in response to a tool die order from a customer, (d) operating on the retrieved blank plate to selectively shape the blank plate into a tool die as ordered by the customer, including (1) operating on the low carbon steel plate portion wherein at least a part of the operations on the low carbon steel plate portion do not include use of carbide tools or electric discharge machines, and (2) precision machining of the tool steel plate portion using at least one of carbide tools and electric discharge machines.

In a preferred form of this aspect of the present invention, the forming step includes cutting the low carbon steel plate portion to a selected outer boundary, and the precision machining operating step includes cutting the tool steel plate portion to form an outer boundary slightly larger than the outer boundary of the low carbon steel plate portion.

In still another preferred form of this aspect of the present invention, the forming step comprises the steps of mechanically securing a low carbon steel plate portion to a tool steel plate portion with a thin layer of brazing material therebetween, and heating the secured low carbon steel plate portion, tool steel plate portion, and brazing material layer to simultaneously (1) melt the brazing material to braze the low carbon steel plate portion to the tool steel plate portion and form the unitary blank plate, and (2) harden the tool steel plate portion.

In another aspect of the present invention, a method of forming a tool die is provided, comprising the steps of (a) providing a base plate portion made of low carbon steel having a generally planar surface, (b) disposing a thin layer of brazing material on the base plate portion planar surface, (c) mechanically securing a plurality of tool steel plates to the base plate portion planar surface with the brazing material between the base plate portion and the tool steel plates, (d) heating the secured base plate portion, tool steel plates, and brazing material layer to simultaneously (1) melt the brazing material to braze the low carbon steel plate to the tool steel plates and form a unitary blank plate, and (2) harden the tool steel plates, and (e) operating on the blank plate to selectively shape the blank plate into a selected tool die design, wherein at least one of the tool steel plates is made of a first grade of tool steel and another of the tool steel plates is made of a second grade of tool steel different than the first grade, with the first grade of tool steel providing a greater durability than the second grade of tool steel and the one tool steel plate is secured to the base plate portion at a location of the tool die subject to greater wear than the location of the another tool steel plate.

In a preferred form of this aspect of the present invention, the first grade of tool steel is one of A2, D2, M2, M4, CPM10V, CPM9V and CMP15V and the second grade of tool steel is a different one of A2, D2, M2, M4, CPM10V, CPM9V and CMP15V.

In yet another aspect of the present invention, a method of forming and maintaining a tool die is provided, comprising the steps of (a) forming a unitary tool blank plate by bonding a low carbon steel plate portion to a tool steel plate portion along substantially the entire surface between the steel plates, the tool steel plate portion being hardened, (b) operating on the blank plate to selectively shape the blank plate into a tool die as ordered by the customer, including (1) operating on the low carbon steel plate portion wherein at least a part of the operations on the low carbon steel plate portion do not include use of carbide tools or electric discharge machines, and (2) precision machining of the tool steel plate portion using at least one of carbide tools and electric discharge machines, (c) using the tool die, (d) periodically remaking the tool die to compensate for wear from use, including (1) machining down the tool steel plate portion to restore the tool die surface on the tool steel plate portion, (2) cutting between the low carbon steel plate portion and the tool steel plate portion to remove the tool steel plate portion from the low carbon steel plate portion when the tool steel plate portion is less than a selected thickness, (3) bonding a new tool steel plate portion along substantially the entire surface of the low carbon steel plate portion, and (4) operating on the newly bonded new tool steel plate portion and low carbon steel portion to reshape the bonded plate portions into the tool die.

In a preferred form of this aspect of the present invention, the bonding steps each comprise the steps of (a) mechanically securing a low carbon steel plate portion to a tool steel plate portion with a thin layer of brazing material therebetween, and (b) heating the secured low carbon steel plate portion, tool steel plate portion, and brazing material layer to simultaneously (1) melt the brazing material to braze the low carbon steel plate portion to the tool steel plate portion and form the unitary blank plate, and (2) harden the tool steel plate portion.

In preferred forms of all aspects of the present invention, the tool steel is one of A2, D2, M2, M4, CPM10V, CPM9V and CMP15V, the brazing material is a layer of substantially pure copper no more than 0.005 inch thick, and preferably about 0.001 inch thick, and the heating step heats the secured low carbon steel plate, tool steel plate, and copper layer to between 1800 and 2100 degrees F.

In yet another preferred form of all aspects of the present invention, the thickness of the tool steel plate and the grade of tool steel used are selected to provide a selected design life without regard to the thickness required for the tool die.

Tool dies made according to the various methods of the present invention are yet another aspect of the present invention.

It is one object of the invention to provide a manufacturing method which allows for a minimal turn-around time once a need for a specific tool die is known.

It is also an object of the invention to provide a manufacturing method which may be used to manufacture tool dies which are both inexpensive and highly durable.

It is another object of the invention to provide a tool die which may be manufactured and used to minimize down time and costs associated therewith.

It is a further object of the invention to provide a manufacturing method which may be readily used for making reworks for use with old tools.

It is yet another object of the invention to provide a manufacturing method and manufactured tool die which are readily adaptable for use with tools which have been found to unduly wear or break specific areas of tool dies used therewith.

It is still another object of the invention to provide tool dies which provide the above advantages.

DESCRIPTION OF THE PREFERRED EMBODIMENT

According to the present invention, a tool die 10 is made of different components whereby the working surface of the die subject to the most wear is made of a highly durable tool steel, and the remainder of the tool die may be made of a less costly material. Such a tool die 10 may be readily used, for example, with punching and stamping operations as are commonly used to make gaskets.

Figure 1:
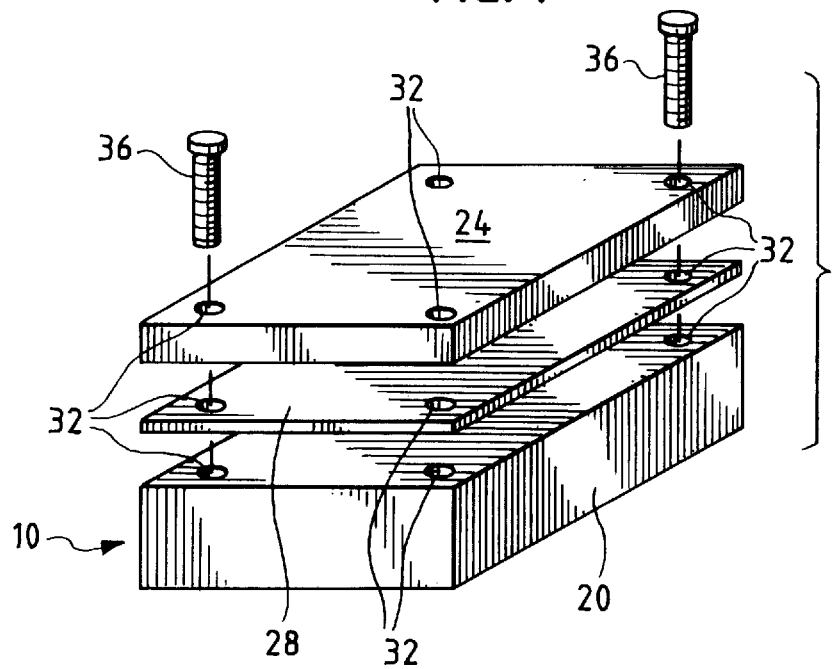
FIG. 1 is an exploded view of the components of the tool die prior to joining together.

Most basically, this is accomplished by mechanically securing a low carbon steel plate 20 to a tool steel plate 24 with a thin layer of brazing material 28 therebetween. Suitable holes 32 may be provided through the plates 20, 24 and thin layer 28 through which screws 36 may be extended to screw the assembly together (four sets of holes 32 are shown in FIG. 1 and preferably screws 36 would be used in each set of holes 32, though only two such screws 36 are shown in FIG. 1).

The holes 32 in the tool steel plate 24 may be countersunk, and the holes 32 in the low carbon steel plate 20 may be threaded for engaging with threads 38 on the screws 36 in order to present a substantially flat top and bottom surface of the assembly.

The holes 32 may also be provided at locations at which the material is anticipated to be removed for the tool die 10. In this manner, even though the screws 36 may be bound into the plates as a result of heat treating as discussed hereafter, the screws 36 may be naturally removed as a part of operating on the plates to form a tool die 10 of a particular design as discussed hereafter.

Still other methods of securing the materials together for subsequent treatment are, however, usable within the scope of the present invention.

The low carbon steel plate 20 may be made of any hot roll steels, cold rolled steels and other low carbon steels which are not hardened by heat treatment. The tool steel plate 24 may be made of any of a wide variety of more expensive steels which are subject to hardening when heat treated, including such steel grades as are identified as A2, D2, M2, M4, CPM10V, CPM9V and CMP15V.

The brazing material 28 may be any of a variety of different materials, for example, copper or silver solder preferably no greater in thickness than 0.005 inch. It has been found that a sheet of substantially pure (>99%) copper having a thickness on the order of 0.001 inch is suitable.

The assembly such as shown in FIG. 1 is then heated to melt layer of brazing material 28 to braze the low carbon steel plate 20 to the tool steel plate 24 and essentially form a unitary blank plate. Simultaneously with brazing, the heating of the assembly hardens the tool steel plate 24. With the use of a 0.001 inch thick layer of copper as previously disclosed, a heat treatment of the assembly at temperatures on the order of 1800 and 2100 degrees F. have been found to be suitable.

A heat treatment according to the above forming a braze connection of a neck of two components (one of CPM10V steel and the other of hot rolled steel) was found to withstand a tension of greater than 45,000 psi without failure (the braze connection did not fail, but ultimately the CPM10V component failed).

Figure 2:
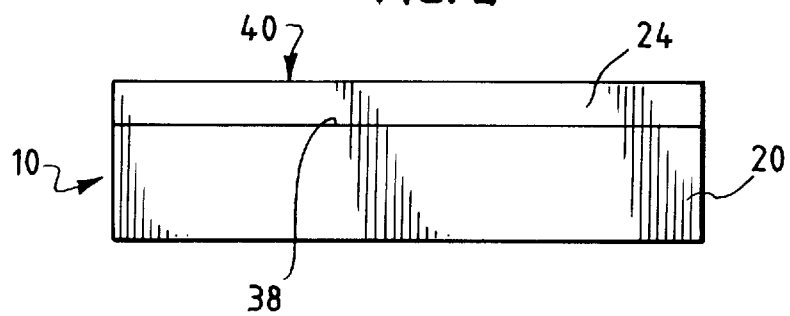
FIG. 2 is a side view of a tool die made according to the present invention.

After heat treatment, a unitary blank plate such as shown at 40 in FIG. 2 is obtained having a hardened tool steel material on one side and a low carbon steel material on the opposite side secured together by a braze connection 38.

Such a unitary blank plate 40 may then be placed in inventory for later use in making a specific tool die 10 according to the customers' needs. That is, as discussed in greater detail hereafter, operations may be done on the blank plate 40 at a later time to create a tool die 10 conforming to any of a virtually infinite variety of designs. Such a tool die 10 may be created with a relatively short turn-around time from the time an order is received, inasmuch as the time-consuming heat treatment process, which is usually a significant time constraint in making the tool, may essentially be performed long prior to the receipt of any tool die order from a customer. Moreover, though many of the operations on the blank plate 40 must thereafter be performed in order to shape the blank plate 40 into the specific design needed for the tool die 10, those operations are not significantly slowed or hindered by the fact that hardening of the blank plate 40 has already been done (because a substantial portion of the blank plate 40 was not hardened by the heat treatment). Such an improved turn-around time can have numerous advantages to the tool die users, as it may result in less down time when a tool die 10 breaks, and can allow the user to maintain fewer backup tool dies.

Further, forming tool dies in this manner permits the tool dies to be made much more inexpensively and/or with a significantly greater quality. That is, the low carbon steel plate 20 can comprise significant portions of the tool die 10 (for example, with punch dies, the low carbon steel plate 20 can comprise about 2.5 inches of an overall thickness of 3 inches) and, typically, high carbon steel such as A2, D2, M2, M4, CPM10V, CPM9V and CMP15V can cost ten or even twenty times more per pound than low carbon steel. The thickness of the tool steel plate and the grade of tool steel used may be selected to provide a selected design life without regard to the thickness required for the tool die 10. Therefore, a given tool die 10 may be made much more inexpensively.

Still further, given the overall cost reduction of materials, the grade of material of the tool steel may be increased to increase the durability of the tool die 10 while not increasing cost or, even, reducing the cost of the tool die 10 over the prior art. For example, a tool die 10 made of entirely of M2 steel according to the prior art could be made with a tool steel plate of higher grade (and more expensive) CPM10V steel and yet still have lower cost of materials due to the significantly lower cost of the low carbon steel used with the other plate portion of the tool die 10. As a result, the tool die user can expect the tool die 10 to last longer and can further expect less down time for maintenance inasmuch as tool dies having a higher grade steel will require less frequent sharpening.

Also, even though the overall tool die 10 may have a thickness requirement of two or more inches, the cost of tool dies used for low volume applications can be significantly reduced by providing a significantly thinner tool steel plate 24 than might be required for normal applications. Therefore, the cost of materials could be significantly reduced by using, for example, only a ¹⁄₁₆ inch tool steel plate 24 for low volume applications versus a ½ inch tool steel plate 24 for higher volume uses.

Still further, the method of the present invention is readily adapted for reworks, that is, making tool dies for existing tools, inasmuch as the required holes for mounting, etc. may more easily be located and formed in view of the greater ease of working on non-hardened low carbon steel.

Once a specific design required by a customer is known, a unitary blank plate 40 may be taken from inventory and worked to the required design. Significantly, as previously noted, those operations are not significantly slowed or hindered as in the prior art by the fact that hardening of the blank plate 40 has already been done because, with the present invention, a substantial portion of the blank plate 40 was not hardened by the heat treatment and therefore may still be more easily cut.

For example, an abrasive water jet process or wire travel electrical discharge machines (EDM) (such as are known in the art) may be used to cut around the blank plate 40 to form the outer circumference of the tool die 10. An abrasive water jet process or plunge-type EDM and other known processes can also be readily used to start holes as may be required in the tool die 10, with such processing being accomplished quickly inasmuch as most of the thickness of the blank plate 40 is relatively soft low carbon steel. In fact, conventional machining (that is, without requiring use of carbide tools or EDM) may be readily used for many of the required operations, which machining could not be readily used if the entire plate 40 were hardened as with the prior art. Thus, holes which may extend only into the low carbon steel plate 20 (as is common, for example, for alignment or mounting holes) may be readily formed.

Some non-conventional machining may still be done on the blank plate 40, for example, a wire EDM may be used to cut the outer circumference or shape of the tool die 10, or may be used to finish holes, but even those operations may be completed much more quickly due to the significant reduction in the hardened material which must be cut. In short, the blank plate 40 may be readily formed to meet customer specifications.

Once completed, the tool die 10 may then be combined with other components as conventionally done heretofore and mounted in the tool to make it ready for use.

Figure 3:
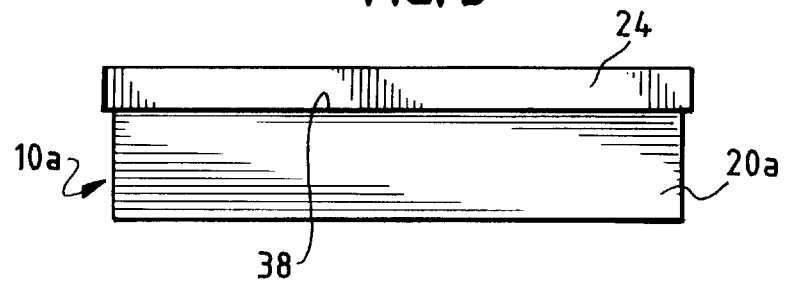
FIG. 3 is a side view, similar to FIG. 2, of an alternate tool die made according to an alternative method of the present invention.

A tool die 10a made according to an alternate embodiment of the present invention is shown in FIG. 3.

With this alternate embodiment, where quick turn-around is not required, the low carbon steel plate 20a may be initially machined to an outer circumference known to be slightly smaller than the designed circumference of the tool die 10a. That low carbon steel plate 20a may then be brazed to a tool steel plate 24 in a manner such as previously disclosed. In subsequent machining, the precise cutting of the outer circumference of the tool die 10a as is accomplished by a wire travel EDM may be accomplished quickly inasmuch as the wire travel EDM will be required to cut only the relatively thin tool steel plate 24. Subsequent further operations as required to form the tool die 10a may then be accomplished such as previously described.

Figure 4:
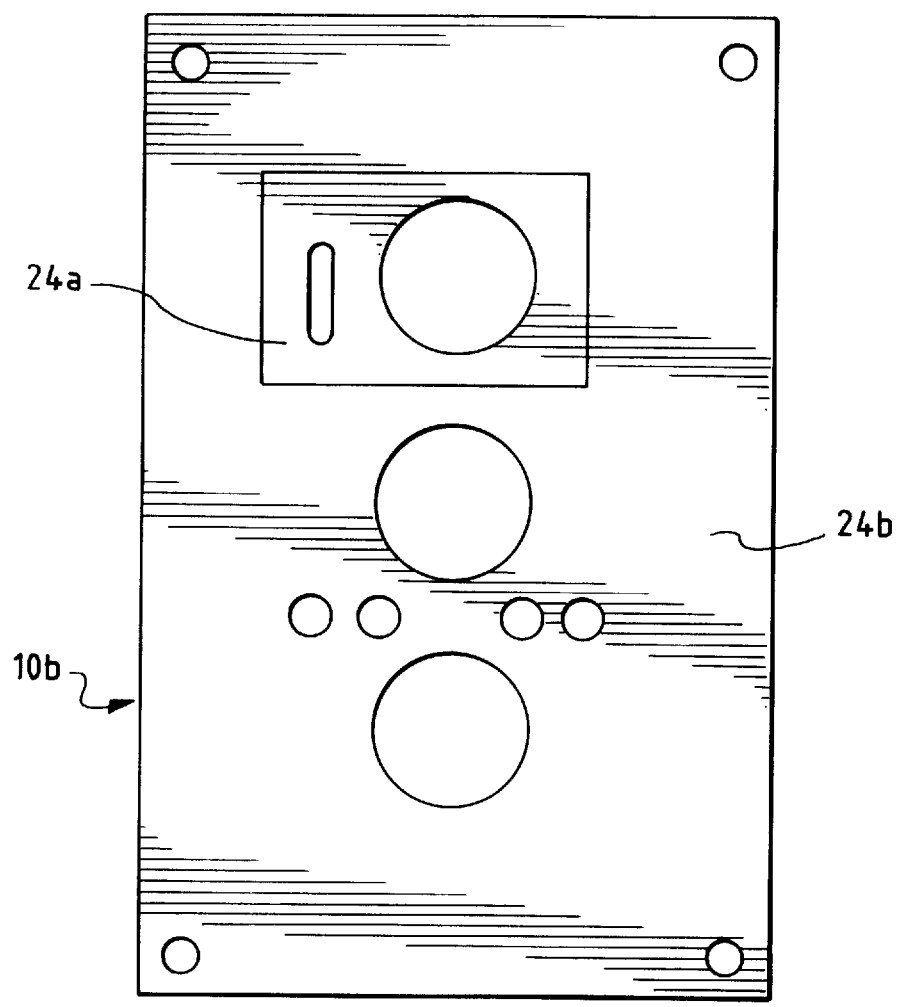
FIG. 4 is a top view of a tool die made according to an alternative embodiment of the present invention, with the tool steel plate being made of two different grades of steel.

A tool die 10b made according to another alternate embodiment of the present invention is shown in FIG. 4.

With this embodiment, a plurality of tool steel plates, having different grades of steel, may be used to form the tool surface side of the tool die 10b. Specifically, where wear is uneven on the tool, or where certain portions of the tool die 10b are found to be more susceptible to cracking or damage during use, a tool steel of a higher grade can be used on that portion of the tool die 10b, with less expensive tool steel used on other areas which are not so susceptible to wear or breaking. Thus, in the embodiment shown in FIG. 4, two separate steel plates 24a, 24b, one such plate 24a being made of a high grade tool steel such as CPM10V for increased durability at a problem area of the tool die 10b (in terms of greater wear or greater susceptibility to breaking), and the other such plate 24b being made of a less expensive tool steel, such as M2 for example, to thereby provide maximum benefit at minimum material cost. It may be recognized that some advantages of a preferred embodiment of the present invention resulting from advance heat treatment might not be obtained with this embodiment (inasmuch as the brazing of selected different tool steel plates 24a, 24b may necessarily be done only after the specific tool design is known), but the advantages of minimum cost, not only directly in materials but also in incidental cost associated with reduced down time due to less required maintenance, etc. as previously discussed, can be maximized with this embodiment.

The present invention may also be used to upgrade worn tool dies. For example, with tool dies originally made according to the present invention, when the tool steel plate 24 is worn down (as a result of use and sharpening) so as to be too thin for continued use, the tool die may be readily cut through the low carbon steel plate 20 to remove the remainder of the tool steel plate 24 and then a new tool steel plate 24 may be brazed to the low carbon steel plate 20 according to the present invention as detailed above. With such a structure, much of the required machining has already been done on the old low carbon steel plate 20 and therefore less machining may be required in remaking the tool die.

Figure 5:
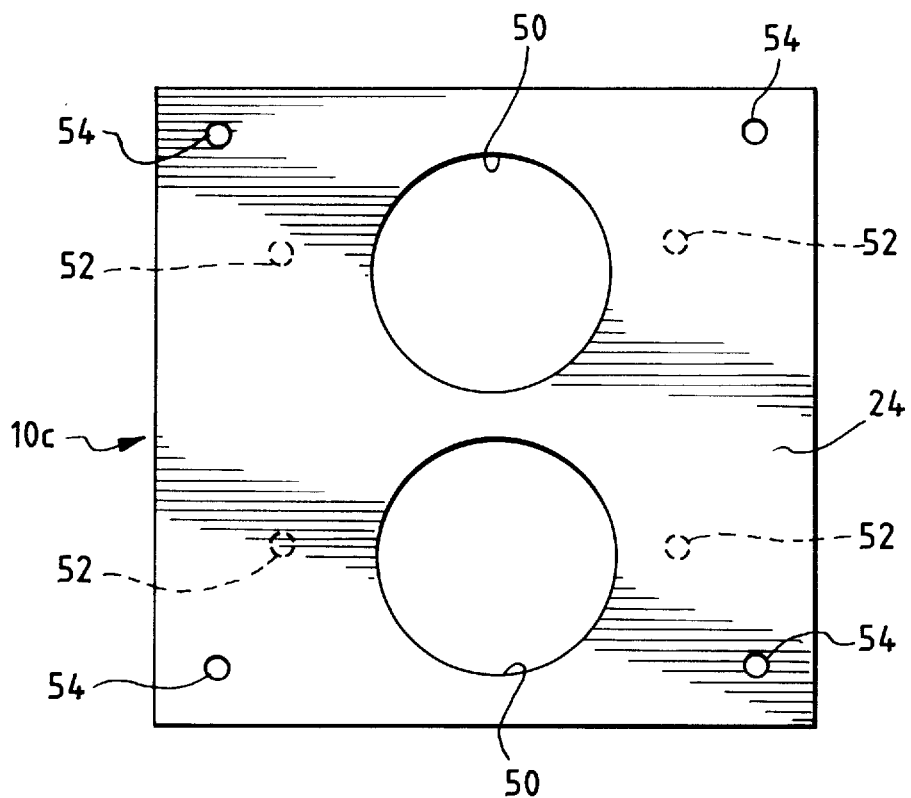
FIG. 5 is a top view of a tool die made according to the present invention.
Figure 6:
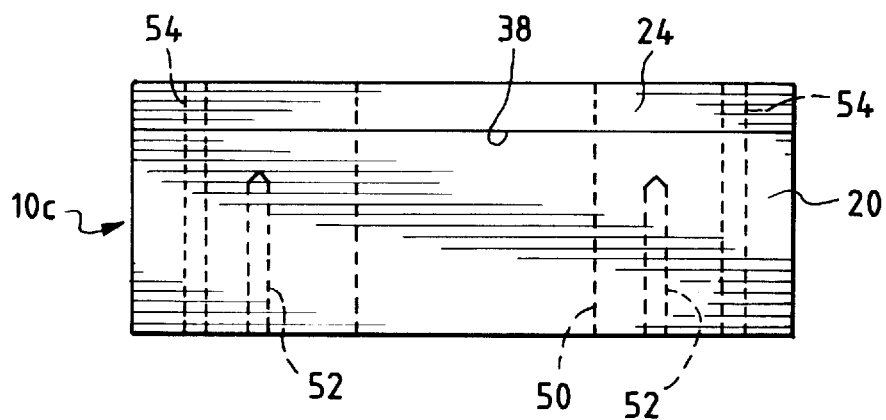
FIG. 6 is a side view of the tool die of FIG. 5.

A sample tool die 10c made according to the basic embodiment of the present invention is shown in FIGS. 5–6. As is common with tool dies, the tool die 10c includes die holes 50 for use, for example, in stamping operations. Mounting holes 52 extend only into the low carbon steel plate 20, and other holes 54 such as might be used for alignment and/or guiding extend through both plates 20, 24. As is readily observable in FIG. 6, particularly, it can be seen that a significant amount of the cutting of the basic steel block is done in the low carbon steel plate 20, which can be easily, quickly and inexpensively accomplished even after heat treating of the block as previously described.

Still other aspects, objects, and advantages of the present invention can be obtained from a study of the specification, the drawings, and the appended claims.

I claim:

1. A method of forming a metal component requiring precise shaping and durability on one side, comprising the steps of:

mechanically securing a low carbon steel plate to a tool steel plate with a thin layer of brazing material therebetween;

heating said secured low carbon steel plate, tool steel plate, and brazing material layer to simultaneously (1) melt said brazing material to braze said low carbon steel plate to said tool steel plate and form a unitary blank plate, and (2) harden said tool steel plate; and operating on said blank plate to selectively shape said blank plate.

2. The method of claim 1, further comprising the steps of:

placing said unitary blank plate in inventory after said heating step; and performing said operating step responsive to customer specifications by retrieving one of said unitary blank plates from inventory and operating on said blank plate to selectively shape said blank plate in conformity with the customer specifications.

3. The method of claim 1, further comprising the step of forming threaded holes in the low carbon steel plate portion of said blank plate after the heating step.

4. The method of claim 1, wherein:

said securing step comprises forming aligned holes of a first diameter in said low carbon steel plate, said tool steel plate, and said brazing material layer, and extending fastening means through said aligned holes; and said operating step includes forming tool holes of a second diameter in the unitary blank plate, said second diameter being greater than said first diameter, wherein said fastening means are removed from said unitary blank plate as a result of formation of the tool holes.

5. The method of claim 1, wherein the thickness of the tool steel plate and the grade of tool steel used are selected to provide a selected design life without regard to the thickness required for the tool die.

6. The method of claim 1, wherein said tool steel is one of A2, D2, M2, M4, CPM10V, CPM9V and CMP15V.

7. The method of claim 1, wherein said brazing material is a layer of substantially pure copper no more than 0.005 inch thick.

8. The method of claim 7, wherein said copper layer is about 0.001 inch thick.

9. The method of claim 7, wherein said heating step heats said secured low carbon steel plate, tool steel plate, and copper layer to between 1800 and 2100 degrees F.

10. The method of claim 7, wherein said tool steel is one of A2, D2, M2, M4, CPM10V, CPM9V and CMP15V.

11. The method of claim 1, wherein the metal component is a tool die.

12. The method of claim 11, wherein the tool die is a punch die, and said low carbon steel plate is at least 1.5 inches thick and said tool steel plate is no greater than 0.5 inches thick.

13. A tool die made by the method of claim 11.

14. A method of forming a metal component requiring a precise shape and durability on one side, comprising the steps of:
cutting a low carbon steel plate to a selected shape generally smaller than the precise shape required on one side of the component;
mechanically securing the cut low carbon steel plate to a tool steel plate with a thin layer of brazing material therebetween;
heating said secured low carbon steel plate, tool steel plate, and brazing material layer to simultaneously (1) melt said brazing material to braze said low carbon steel plate to said tool steel plate and form a unitary blank plate, and (2) harden said tool steel plate; and
operating on said blank plate to selectively shape said blank plate, including the step of cutting said tool steel plate to said precise shape by use of a wire electric discharge machine.

15. The method of claim 14, further comprising the step of forming threaded holes in the low carbon steel plate portion of said blank plate after the heating step.

16. The method of claim 14, wherein the thickness of the tool steel plate and the grade of tool steel used are selected to provide a selected design life without regard to the thickness required for the tool die.

17. The method of claim 14, wherein said tool steel is one of A2, D2, M2, M4, CPM10V, CPM9V and CMP15V.

18. The method of claim 14, wherein said brazing material is a layer of substantially pure copper no more than 0.005 inch thick.

19. The method of claim 18, wherein said copper layer is about 0.001 inch thick.

20. The method of claim 18, wherein said heating step heats said secured low carbon steel plate, tool steel plate, and copper layer to between 1800 and 2100 degrees F.

21. The method of claim 18, wherein said tool steel is one of A2, D2, M2, M4, CPM10V, CPM9V and CMP15V.

22. The method of claim 14, wherein the metal component is a tool die.

23. The method of claim 22, wherein the tool die is a punch die, and said low carbon steel plate is at least 1.5 inches thick and said tool steel plate is no greater than 0.5 inches thick.

24. A tool die made by the method of claim 22.

25. A method of forming a tool die, comprising the steps of:
providing a base plate portion made of low carbon steel having a generally planar surface;
disposing a thin layer of brazing material on said base plate portion planar surface;
mechanically securing a plurality of tool steel plates to the base plate portion planar surface with the brazing material between said base plate portion and said tool steel plates;
heating said secured base plate portion, tool steel plates, and brazing material layer to simultaneously (1) melt said brazing material to braze said low carbon steel plate to said tool steel plates and form a unitary blank plate, and (2) harden said tool steel plate; and
operating on said blank plate to selectively shape said blank plate into a selected tool die design;
wherein at least one of said tool steel plates is made of a first grade of tool steel and another of said tool steel plates is made of a second grade of tool steel different than the first grade, with said first grade of tool steel providing a greater durability than said second grade of tool steel and said one tool steel plate is secured to said base plate portion at a location of said tool die subject to greater wear than the location of said another tool steel plate.

26. The method of claim 25, wherein said first grade of tool steel is one of A2, D2, M2, M4, CPM10V, CPM9V and CMP15V and said second grade of tool steel is a different one of A2, D2, M2, M4, CPM10V, CPM9V and CMP15V.

27. The method of claim 25, wherein said brazing material is a layer of substantially pure copper no more than 0.005 inch thick.

28. The method of claim 27, wherein said copper layer is about 0.001 inch thick.

29. The method of claim 27, wherein said heating step heats said secured base plate portion, tool steel plates, and copper layer to between 1800 and 2100 degrees F.

30. The method of claim 27, wherein said first grade of tool steel is one of A2, D2, M2, M4, CPM10V, CPM9V and CMP15V and said second grade of tool steel is a different one of A2, D2, M2, M4, CPM10V, CPM9V and CMP15V.

31. A tool die made by the method of claim 25.

* * * * *